(12) United States Patent
Thomason (10) Patent No.: US 11,072,280 B1
(45) Date of Patent: Jul. 27, 2021

(54) REAR-END COLLISION AVOIDANCE SYSTEM

(71) Applicant: Transportation Safety Logic LLC, Oxford, MS (US)

(72) Inventor: Joshua Childs Thomason, Batesville, MS (US)

(73) Assignee: Transportation Safety logic, LLC, Oxford, MS (US)

( * ) Notice: Subject to any disclaimer, the term of this patent is extended or adjusted under 35 U.S.C. 154(b) by 0 days.

(21) Appl. No.: 17/114,897

(22) Filed: Dec. 8, 2020

Related U.S. Application Data (60) Provisional application No. 62/948,979, filed on Dec. 17, 2019.

(51) Int. Cl.
*B60Q 7/02* (2006.01)

(52) U.S. Cl.
CPC ..................... *B60Q 7/02* (2013.01)

(58) Field of Classification Search
CPC ....................................................... B60Q 7/02
USPC ........................................................ 340/468
See application file for complete search history.

(56) References Cited

U.S. PATENT DOCUMENTS

| | | | | |
|---|---|---|---|---|
| 5,260,686 A * | 11/1993 | Kuo | ..................... | B60Q 1/0011 340/464 |
| 5,652,565 A * | 7/1997 | Salcedas | ................. | B60Q 1/302 340/467 |
| 5,838,228 A * | 11/1998 | Clark | ..................... | B60Q 1/525 340/436 |
| 6,178,677 B1 * | 1/2001 | Williams | ............... | B60Q 1/503 340/902 |
| 6,211,778 B1 | 4/2001 | Reeves | | |
| 6,225,918 B1 * | 5/2001 | Kam | ....................... | B60Q 1/44 180/169 |
| 6,940,392 B2 | 9/2005 | Chan et al. | | |
| 9,493,187 B2 | 11/2016 | Pilutti et al. | | |
| 9,799,241 B2 * | 10/2017 | Stockton | ................ | B60Q 1/268 |
| 9,994,147 B2 | 6/2018 | Yan | | |
| 10,118,648 B2 | 11/2018 | Hallik et al. | | |
| 10,556,537 B2 * | 2/2020 | John | ...................... | B60Q 1/503 |
| 2003/0197606 A1 * | 10/2003 | Epstein | .................... | B60Q 1/54 340/466 |
| 2004/0046647 A1 | 3/2004 | Reeves et al. | | |

(Continued)

FOREIGN PATENT DOCUMENTS

CA 2240653 A1 12/1998

*Primary Examiner* — Kerri L McNally
(74) *Attorney, Agent, or Firm* — Veritay Group IP PLLC; Susan B. Fentress; Liam O'Donnell (57) ABSTRACT

The present invention provides a rear-end collision system and methods. A rear-end collision avoidance system includes: a signaling device made of: a geometric-shaped main body having inner LED light panel connected to the brake pedal of the vehicle, wherein the inner LED light panel is configured to display at least one sign when brake is applied, an array of light emitters disposed along a periphery of the geometric shaped main body to emit lights associated with the at least one sign, a laser unit disposed at the bottom of the geometric shaped main body, wherein the laser unit is configured to project laser line on the road relative to ending of the load to notify the following vehicle to maintain a safe distance from the laser line in order to avoid collision, and at least one connector that is configured to secure the main body onto load of the rear portion of a vehicle.

18 Claims, 5 Drawing Sheets

(56) References Cited

U.S. PATENT DOCUMENTS

| | | | |
|---|---|---|---|
| 2005/0099287 A1* | 5/2005 | Su ......................... | B60Q 1/503 |
| | | | 340/464 |
| 2006/0232396 A1* | 10/2006 | Qasem ................... | H05B 45/00 |
| | | | 340/479 |
| 2007/0013504 A1* | 1/2007 | Cernik ................... | B60Q 9/008 |
| | | | 340/463 |
| 2008/0041297 A1* | 2/2008 | Vazin ..................... | B60Q 1/503 |
| | | | 116/32 |
| 2013/0335212 A1* | 12/2013 | Purks ...................... | B60Q 1/38 |
| | | | 340/435 |
| 2014/0062690 A1* | 3/2014 | Chang ..................... | B60Q 7/00 |
| | | | 340/471 |
| 2014/0300464 A1* | 10/2014 | Chen ....................... | B60Q 1/24 |
| | | | 340/471 |

\* cited by examiner

REAR-END COLLISION AVOIDANCE SYSTEM

CROSS-REFERENCE TO RELATED APPLICATIONS

This application claims the benefit of US provisional patent application filed Dec. 17, 2019 Ser. No. 62/948,979 under 35 USC § 119(e). (hereby incorporated by reference).

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention is related to a vehicle safety system. More specifically, the present invention is related to a rear-end collision avoidance system for vehicles and a method of use thereof.

BACKGROUND OF THE INVENTION

Nowadays, the number of vehicles on the roads has increased. The accident rate of vehicles, more specifically, trailer trucks and log trucks, is relatively high. An examination of highway safety statistics reveals log trucks are more likely to experience a rollover during a crash with occurrences in 78% of fatal crashes. The cost of lives, injuries, and consequences related to these crashes are overwhelming. Some vehicles are equipped with collision detection systems to help in predicting and warning of a potential collision with another car. Typically, the collision detection systems are either installed at the front-end, which detect objects in front of the host vehicle or at the rear-end, which detect objects behind the host vehicle.

Stockton U.S. Pat. No. 9,799,241B2 shows a stop sign brake light installed at the rear-end of vehicles. The stop sign brake light body was found to have an octagonal shape, a reflective border and the word STOP is positioned along the center of the body, and a controller having a wiring harness for connecting to a vehicle power source.

Yan U.S. Pat. No. 9,994,147B2 shows a collision-avoidance system having a proximity sensor for a lead vehicle to determine an actual distance between the lead vehicle and the following vehicle. A projector for the lead vehicle is configured to project above ground level, an image from the lead vehicle towards the next vehicle to notify about the lead vehicle. A control module for the lead vehicle is configured to instruct the projector to project the image when the actual distance is less than a threshold distance.

Reeves US20040046647A1, shows a vehicle safety sensor to detect the presence of adjacent objects near the vehicle to avoid a collision. In one of the embodiments, it discusses three detection ranges providing feedback with various lights and sounds which are enabled to use with separate sensors, wherein some sensors automatically make "live" upon reversing or turning of the vehicle, and some sensors are equipped to be manually activated, in a situation of overpass.

Further, some effort has previously been made to design systems to flash brake light intermittently while the vehicle is braking. However, these systems add costs to manufactures.

SUMMARY OF THE INVENTION

The inventive subject matter solves the technical issue by providing a vehicle safety device and a system enabled to install at a rear-end of an existing vehicle to avoid collision between vehicles from a rear-end. A rear-end collision avoidance system includes: a signaling device made of: a geometric-shaped main body having inner light panel, wherein the inner light panel is configured to display at least one sign, an array of light emitters disposed along a periphery of the geometric shaped main body to emit lights associated with the at least one sign, a laser unit disposed at the bottom of the geometric shaped main body, wherein the laser unit is configured to project laser line on the road relative to ending of the load to notify the following vehicle to maintain a safe distance from the laser line in order to avoid collision and at least one connector that is configured to secure the main body onto load of the rear portion of a vehicle. More specifically, the inventive subject matter includes: a rear-end collision avoidance system made of a signaling device, having an inner light panel on a main body, connected to a brake pedal of a vehicle; an array of light emitters disposed along a periphery of the main body to emit lights associated with the at least one sign, a proximity sensor to detect a following vehicle; a laser unit disposed at bottom of the main body, wherein the laser unit is configured to project a laser line on a road relative to an end of a load; and at least one connector configured to secure the main body of the signaling device to a rear portion of the vehicle or to a trailer attached to the vehicle; wherein an inner light panel is configured to display an at least one sign to notify the following vehicle to maintain a safe distance from the laser line in order to avoid collision with the vehicle.

One object of the present invention is to prevent a collision by displaying at least one sign using the signaling device wherein the at least one sign is at least one of but not limited to BREAK, STOP, ACCIDENT AHEAD, SLOW DOWN, and EMERGENCY AHEAD. Further, the geometric-shaped main body including at least one or more wireless charging magnets disposed at the bottom of the main body at regular intervals for charging a battery unit of the signaling device.

More specifically, the inventive subject matter includes: a method for notifying a following vehicle of the position of a lead vehicle with a load. This method includes the steps of: connecting a signaling device to the lead vehicle, wherein the signaling device is made of: an inner light panel on a main body, connected to a brake pedal of the lead vehicle; an array of light emitters disposed along a periphery of the main body to emit lights associated with the at least one sign, a proximity sensor to detect a following vehicle; and a laser unit disposed at bottom of the main body, wherein the laser unit is configured to project a laser line on a road relative to an end of a load; displaying the laser line on a road relative to an end of a load; detecting the presence of the following vehicle; and displaying an at least one sign by the signaling device to notify the following vehicle to maintain a safe distance from the laser line in order to avoid collision with the lead vehicle. Another aspect of the present invention includes the geometric-shaped main body made of a portable camera unit configured to capture image data of the following vehicles at the rear end and one or more processor to process the at least one captured image data.

BRIEF DESCRIPTION OF THE DRAWINGS

The preceding summary of the preferred embodiment is better understood when read in conjunction with the appended drawings. It is understood, however, that the invention is not limited to the specific system, methods, and devices disclosed.

DETAILED DESCRIPTION OF THE INVENTION

The present invention will be more completely understood through the following detailed description, which should be read in conjunction with the attached drawing in which similar reference numbers indicate similar structures. All references cited above and in the following description are hereby expressly incorporated by reference. Reference will now be made in detail to the exemplary embodiment(s) of the invention. References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
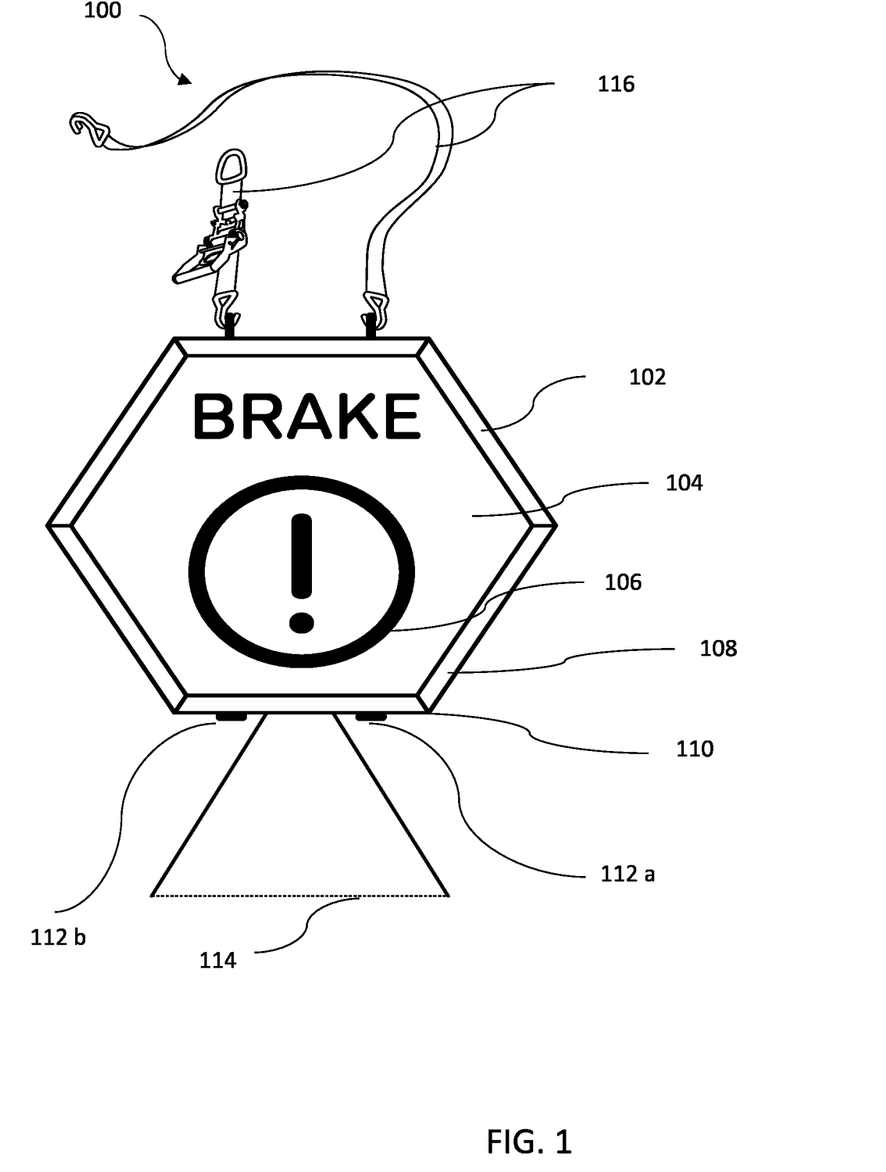
FIG. 1 is a front view of the signaling device according to the preferred embodiment of the present invention.

The present invention provides a rear-end collision system and methods. FIG. 1 is a front view of the signaling device (100) according to the preferred embodiment of the present invention. As shown, the signaling device (100) can be of any shape, including but not limited to, preferably geometric-shaped main body (102) such as a hexagon that is constructed from a lightweight material such as injection-molded plastic, carbon fiber, aluminum, or polymeric material for example. The front side of the main body can be made of a polycarbonate surface. The main body (102) having an inner light panel (104) disposed at the front side of the body wherein the inner light panel (104) may be at least one of the but not limited to LCD, LED, OLED display. The display portion may have a resolution of at least 50 ppi, 100 ppi, 200 ppi, 300 ppi or over 300 ppi. The polycarbonate surface is bonded over the inner light panel (104). The backside of the main body (102) is made of a durable surface material, such as carbon fiber, aluminum, or a polymeric material. Further, the main body (102) includes an array of light emitters disposed along the periphery (108) of the main body (102).

In one example, the inner light panel (104) is connected to a brake pedal of the vehicle, wherein the inner light panel (104) is configured to display at least one sign (106) when a user applies the brake. The sign is at least one of the but not limited to BREAK, STOP, ACCIDENT AHEAD, SLOW DOWN, EMERGENCY AHEAD or any other.

Further, a laser unit (114) is disposed at a bottom (110) of the main body (102), wherein the laser unit (114) is configured to project a laser line on the road relative to ending of the load to notify the following vehicle to maintain a safe distance from the laser line in order to avoid collision and at least one connector (116) that is configured to secure the main body (102) onto the load at the rear portion of the vehicle. The laser (114) can project outwardly to define a safe distance between the load at the rear portion of the vehicle and a following vehicle. In one example, the main body (102) is secured onto a hanging load at the rear portion of the vehicle. The at least one connector is a ratchet strap. The ratchet strap has a strap with an attachment end and a free end joined for holding the main body (102) safely onto the load or rear portion of the vehicle. The vehicle is at least one of but not limited to a log truck, groove trailer, truck, bus, car or any other.

Further, the main body (102) includes at least one or more wireless charging magnets (112a, 11b) disposed at the bottom of the main body at regular intervals for charging the battery unit of the signaling device (100). The battery may include a rechargeable battery, e.g. lithium-ion, nickel-cadmium, nickel-zinc, or any other type of rechargeable or non-rechargeable battery. In one example, a wired charger is used to charge the signaling device.

According to one exemplary embodiment, the inner light panel (104) illuminates and displays at least one sign when at least one of the situations occurs, such as when a user applies the brake, the user is slowing down the vehicle, or user stops the vehicle. In the preferred embodiment, the inner light panel (104) includes a plurality of light-emitting diodes (LEDs) that are illuminated to display at one sign, and the array of light emitters disposed along the periphery of the geometric shaped main body illuminates when a sign is displayed. The array of light emitters are enabled to emit lights of different colors (i.e. white, red, green, orange, pink, yellow, etc.) based upon the displayed sign to attract the attention of the following vehicles to prevent many rear-end collision and save countless lives in this process. In one embodiment, the lights from the emitters can fluctuate or can flash or changes brightness or remain in a constant state of illumination to better attract the attention of the following drivers. Further, the main body is enabling the lights to change color, remain illuminated and/or flashing and likewise.

In one exemplary embodiment, the signaling device (100) can be constructed based on the type of vehicle is to be used and can be of different dimensions based on the usage of the different vehicles. The invention is not to be constructed as limited to these sizes and shapes. In this regard, the main body is not limited to any particular size, color, shape or construction material. The main body can be provided in any number of different colors lights, shapes, and language to be recognizable in a variety of different countries.

Figure 2:
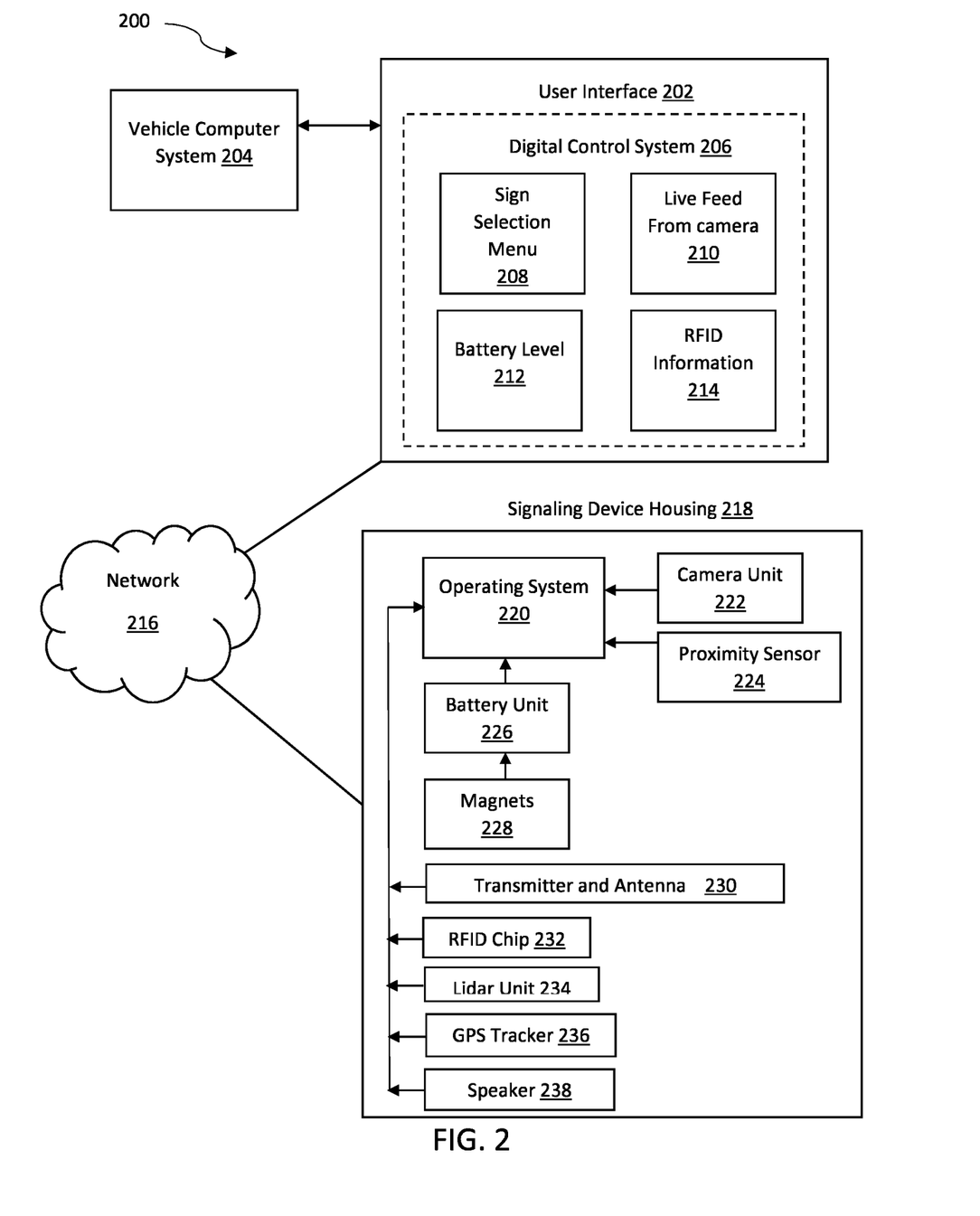
FIG. 2 shows a schematic diagram of an overview of the system.

FIG. 2 is a schematic diagram of overview of the system (200). The rear-end collision system (200) includes a graphical user interface (202), signaling device (218) and an operating system (220) for performing the disclosed embodiments. The signaling device (218) and the graphical user interface (202) are connected via one network (216). The signaling device (218) may include operating system (220) such as Microsoft Corp.'s windows, Apple Corp's Macintosh operating system, Google, Android, LINUX, UNIX, or a custom operating system. The signaling device further includes a processor and a memory (not shown). The memory stores information accessible by the processor including instructions and data that may be executed or otherwise used by the processor. The signaling device (218) includes a controller unit located in the cab of the vehicle. The controller unit can be a graphical user interface (202). The graphical user interface (202) may be having wired or wireless connection with a vehicle computer system (204). The vehicle computer system is enabled to determine vehicle speed, when a user applies break, when a user stops the vehicle.

A digital control system (i.e. application interface) (206) on the graphical user interface (202) provides user of the vehicle with at least one or more of the sign selection menu (208), live feed from a camera unit (210), battery level of signaling device (212) or current status of the battery unit (i.e. charging), RFID chip information (214).

The controller unit with a memory includes instructions to select at least one sign for display on the inner light panel. In one example, the controller unit is enabled to sense any collision and display the one sign accordingly. In another example, the user of the device is enabled to select at least one sign on the sign selection menu (208) based on an emergency. The situational usage with applicable signage is displayed on the signaling device based on the user input, such as ACCIDENT AHEAD, SLOW DOWN, and EMERGENCY AHEAD.

According to one exemplary embodiment, the signaling device (218) includes a portable camera unit (222), a lidar or sonar unit (246) and, a proximity sensor (224). The portable camera unit (222) configured to capture image data of the following vehicles at the rear end and one or more processor to process at least one captured image data. The image data may include still images, videos (e.g. moving images or a series of images) of one or more rear side vehicles within the field of view of the camera unit (222). The camera unit (222) can be enabled to send image data to the cloud and/or user of the vehicle using a communication interface. The communication interface can be a wired or wireless network. Further, the signaling device (218) includes a transmitter and antenna (230) for sending and receiving information over a communication interface.

The wireless network may employ at least one of the cellular communication protocols such as long-term evolution (LTE), LTE-advance (LTE-A), code division multiple access (CDMA), wideband CDMA (WCDMA), universal mobile telecommunications system (UMTS), global system for mobile communications (GSM). The wireless network may include, for example, a short-range communication wherein the short-range communication is at least of the but not limited to wireless fidelity (Wi-Fi), Bluetooth (BT), near field communication (NFC) or GNSS.

In another example, the camera unit (222) is configured to send the live image data to the user interface of the vehicle. The camera unit (222) also includes of a proximity sensor (224) wherein the proximity sensor (224) is configured to detect the speed and/or distance between the user's vehicle and the following vehicle to generate warning or alerts (such as visual alert output, a tactile alert output, and/or audio alert output) to the user of the vehicle. The warning or alerts are communicated to the graphical user interface (202) of the driver's vehicle so that the user can take appropriate action to avoid a collision. The user interface can be PDA, smartphone, LCD, LED, and tablet.

The user of the vehicle can access the image data from the cloud at any remote location using any computing device. The computing device can be, for example, mobile phones, smartphones, PDAs, tablets, laptops, and desktop. The user is enabled to view the number of alerts, view the history, view live and/or stored recordings, live activity around the rear end of the vehicle. In one example, the image and/or video is stored in the memory of the camera unit and can be retrieved by connecting external data storage devices, for example, hard-disk, pen drive, CD, and others.

Further, the lidar unit (246) is configured to detect any kinds of objects including one or more vehicles, people or others around the user's vehicle such as vehicles traveling behind the user's vehicle, or vehicles travels in same direction as user's vehicle. Generally, LiDAR known as Light Imaging Detecting and Ranging is a technology which detects objects on the surface, as well as their size and exact disposition by receiving a reflected Laser signal by the objects. The detection of the following vehicle is accomplished based on at least one of the captured image data by the camera unit (222), the detection result by the lidar unit (246)

In one exemplary embodiment, the signaling device (218) includes an internet enabled GPS tracker (236), RFID chip (232) and a built-in speaker (238). The internet enabled GPS tracker (236) is configured to calculate the exact current position of the signaling device to view remotely on user interface where the vehicle is heading. More specifically, in addition to the current position of the signaling device, the user of the device is enabled to view the current position of the user's vehicle and the obstacle around the vehicle. The presence/absence of the obstacle is accomplished based on at least one of the captured image data by the camera unit (222), the detection result by the lidar unit (246). Further, the RFID chip (232) is configured to record information of shipping and receiving at plants by the user's vehicle. For example, in case of log-trucks, trailer the information in the RFID chip in the signaling device is used to identify whether the entities are delivered and/or received by the user.

Also, the built-in speaker (238) within the signaling device (218) is configured to generate an audible alert to the following vehicle to maintain a safe distance from the user's vehicle when the following vehicle is proximate to the user's vehicle. The proximity is detected via at least of the camera unit (222), lidar unit (234) etc. In one example, the signaling device (218) includes an at least one or more wireless magnets (228) for charging the battery (226) of the signaling device.

Figure 3:
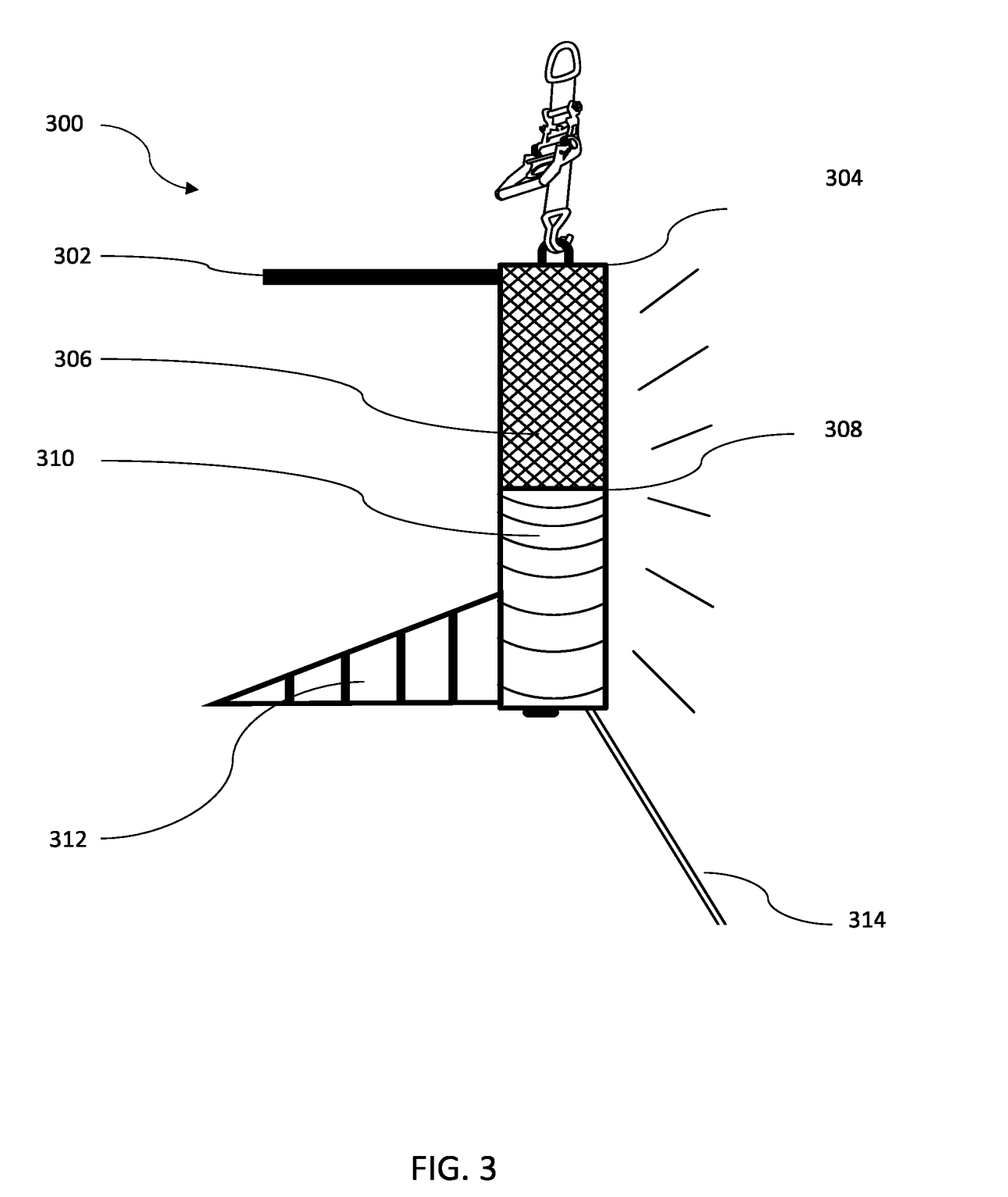
FIG. 3 is a left side view of the signaling device by one embodiment of the present invention.

FIG. 3 is a left side view of the signaling device (300) according to one embodiment of the present invention. The main body (304) of the signaling device (300) has an inner light panel (308) displaying at least one sign. The backside of the main body (304) includes of a brace bar (302) at the top side of the main body (304) and a stabilizer (312) at the bottom side pivotally fixed to the main body (304) in order to provide stability to the signaling device (300) when connected at the rear end of the vehicle or when the signaling device (300) is placed horizontally on the surface. Further, the main body (304) in one exemplary embodiment can include at least one or more solar panels (306) wherein the at least one or more solar panel is monocrystalline silicon solar panel, polycrystalline silicon solar plate, concentrated PV cell or any other.

The one or more solar panel (306) is configured to collect energy from a light source such as sun and convert that energy with an inverter into DC power and/or store the power into the battery unit. The inverter (not shown) may be located on an outer surface and protected by a cover, or it may be included within the housing. The inverter may have any wattage and any voltage, depending on number of batteries, the inverter can be upto 50, 250, 500, 1000, 2000 or 4000 W and/or may include 2 to 24 volts or other voltage. The one or more solar panels (306) are configured to charge the battery unit of the signaling device. In one embodiment, the charging status information will then be calculated and displayed at the graphical user interface of the vehicle informing the user how much time duration remains that the signaling device may continue working.

Further, the main body (304) includes at least one light panel (310) configured to display the left and/or right turn signal when the vehicle shifts lane or turns in either the left or right direction. The left or right turn signal is activated to alert the following vehicle to pay attention to avoid the collision. Further, the laser unit (314) is projecting laser line on the road relative to ending of the load wherein the laser line preferably has solid line more or less than 8 ft to 12 ft width to cover the road travel lane.

Figure 4:
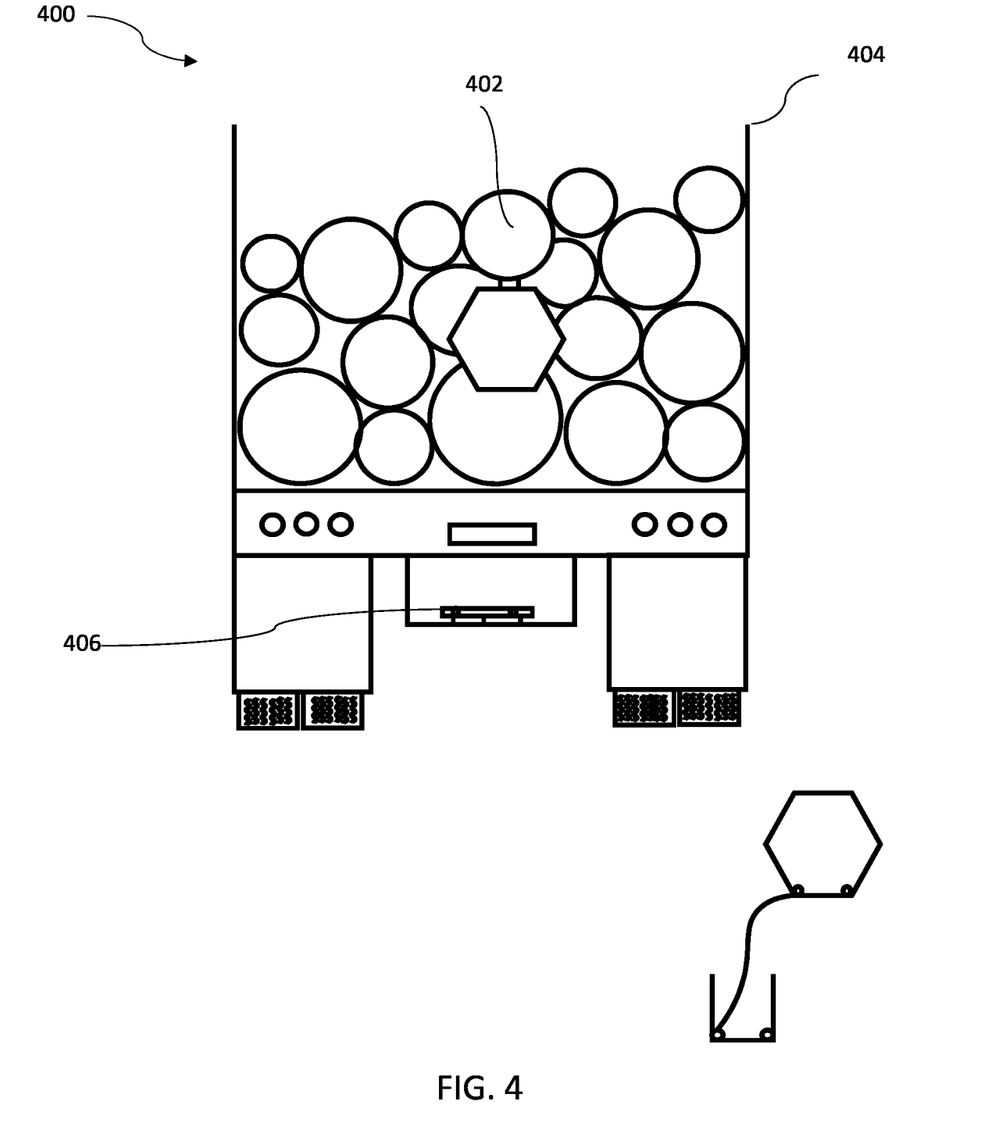
FIG. 4 is a perspective view of the signaling device when attached to the load of the vehicle.

FIG. 4 is a perspective view of the signaling device (400) when attached to the load (i.e.) a cylindrical object. (402) such as for example a log or a pipe of the vehicle (404) at the rear end. In one embodiment, a mounting plate (406) is attached to the truck for attaching the signaling device at the bottom side of the rear portion of the vehicle (404), shown for example, as a log truck.

Figure 5:
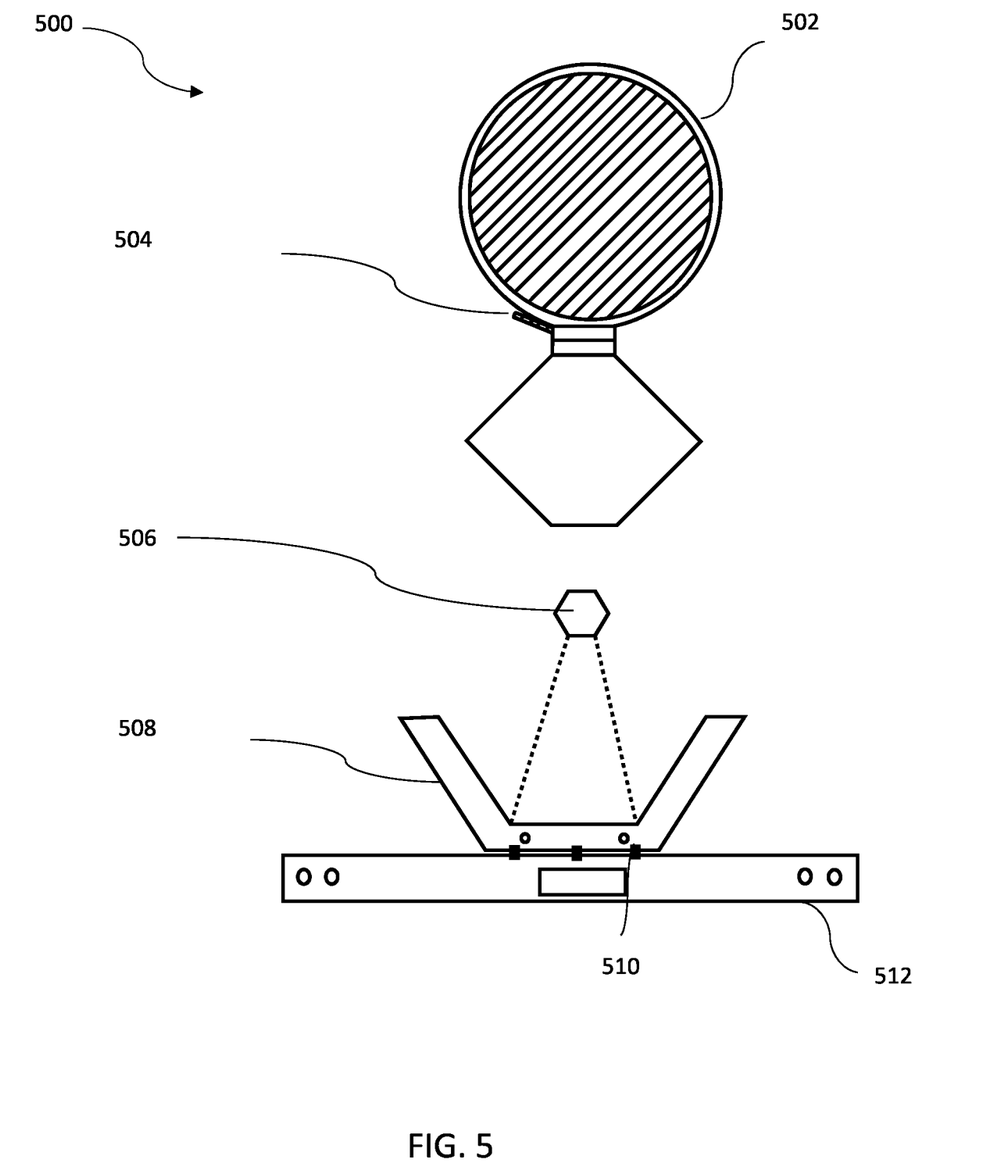
FIG. 5 is a trailer mount view of the mounting plate according to one exemplary embodiment of the present invention.

FIG. 5 is a trailer mount view (500) of the mounting plate according to one exemplary embodiment of the present invention. The main body (506) of the signaling device (502) is attached to the load using a ratchet strap (504). Further, the signaling device (502) is attached to the mounting plate (508). The mounting plate (508) is connected to the trailer rear bar (512) via at least one or more locking pin connectors (510). In one example, the mounting plate (508) is enabled to charge the signaling device (502) when attached therein using at least one or more wireless magnets.

While the invention has been described in detail with specific reference to embodiments thereof, it is understood that variations and modifications thereof may be made without departing from the true spirit and scope of the invention.

The invention claimed is:

1. A rear-end collision avoidance system comprising:
a signaling device, having an inner light panel on a main body, connected to a brake pedal of a vehicle;
an array of light emitters disposed along a periphery of the main body to emit lights associated with an at least one sign,
a proximity sensor to detect a following vehicle;
a laser unit disposed at bottom of the main body, wherein the laser unit is configured to project a laser line on a road relative to an end of a load; and
an at least one connector configured to secure the main body of the signaling device to a rear portion of the vehicle or to a trailer attached to said vehicle; wherein an inner light panel is configured to display an at least one sign to notify the following vehicle to maintain a safe distance from the laser line in order to avoid collision with the vehicle.

2. The rear-end collision avoidance system of claim 1, wherein the at least one connector is attached to the load positioned in the vehicle or to the load positioned in the trailer attached to said vehicle.

3. The rear-end collision avoidance system of claim 1, wherein a front side of the main body is made of a polycarbonate surface wherein the polycarbonate surface is bonded over the inner light panel.

4. The rear-end collision avoidance system of claim 1, wherein the inner light panel includes at least one selected from the group consisting of: an LCD, a LED and an OLED display.

5. The rear-end collision avoidance system of claim 1, further comprising a graphical user interface positioned in the vehicle to provide a user with a selection of notices to the following vehicle.

6. The rear-end collision avoidance system of claim 1, wherein the main body of the signaling device comprises a brace bar and a stabilizer to provide stability to the signaling device when placed horizontally.

7. The rear-end collision avoidance system of claim 1, wherein the main body of the signaling device comprises an at least one or more solar panel to charge a battery.

8. The rear-end collision avoidance system of claim 1, wherein the main body of the signaling device comprises an at least one or more wireless magnets configured to wirelessly charge a battery.

9. The rear-end collision avoidance system of claim 1, wherein main body of the signaling device comprises a camera unit.

10. The rear-end collision avoidance system of claim 1, wherein main body of the signaling device comprises a battery, a lidar unit, and a GPS tracker.

11. The rear-end collision avoidance system of claim 1, wherein main body of the signaling device comprises a lidar unit.

12. The rear-end collision avoidance system of claim 1, wherein main body of the signaling device comprises a GPS tracker.

13. The rear-end collision avoidance system of claim 10, wherein a camera unit is configured to capture image data of the following vehicle at the rear portion of the vehicle.

14. The rear-end collision avoidance system of claim 1, wherein main body of the signaling device comprises a sonar unit.

15. The rear-end collision avoidance system of claim 1, wherein the at least one connector is attached to a mounting plate and the mounting plate is connected to a trailer rear bar.

16. A method for notifying a following vehicle of the position of a lead vehicle with a load, the method comprising:
connecting a signaling device to the lead vehicle, wherein the signaling device is comprised of: an inner light panel on a main body, connected to a brake pedal of the lead vehicle; an array of light emitters disposed along a periphery of the main body to emit lights associated with the at least one sign, a proximity sensor to detect a following vehicle; and a laser unit disposed at bottom of the main body, wherein the laser unit is configured to project a laser line on a road relative to an end of the load;
displaying the laser line on a road relative to an end of the load;
detecting the presence of the following vehicle; and displaying an at least one sign by the signaling device to notify the following vehicle to maintain a safe distance from the laser line in order to avoid collision with the lead vehicle.

17. The method of claim 16 wherein the signaling device is connected to a rear portion of the load.

18. The method of claim 16 wherein the signaling device is connected to a mounting plate and the mounting plate is connected to a trailer rear bar.

* * * * *